United States Patent

Yu et al.

[11] Patent Number: 5,911,934
[45] Date of Patent: Jun. 15, 1999

[54] PHOTORECEPTOR CALENDERING METHOD

[75] Inventors: Robert C. U. Yu, Webster; John A. Bergfjord, Sr., Macedon; Michael S. Roetker, Rochester, all of N.Y.

[73] Assignee: Xerox Corporation, Stamford, Conn.

[21] Appl. No.: 08/924,566

[22] Filed: Sep. 5, 1997

[51] Int. Cl.⁶ .......................... B29C 43/22; B29C 71/00; B29C 67/20; G03G 5/00
[52] U.S. Cl. .......................... 264/237; 264/280; 264/322; 264/342 RE; 264/345; 430/127
[58] Field of Search .................. 264/280, 237, 264/348, 322, 345, 346, 210.1, 210.2, 210.5, 342 RE; 430/127, 133, 58, 59

[56] References Cited

U.S. PATENT DOCUMENTS

| | | | |
|---|---|---|---|
| 2,177,659 | 10/1939 | Kimble et al. | 264/280 |
| 3,916,022 | 10/1975 | Potter | 264/22 |
| 4,140,740 | 2/1979 | De Smedt et al. | 264/146 |
| 4,265,990 | 5/1981 | Stolka et al. | 430/59 |
| 4,983,481 | 1/1991 | Yu | 430/59 |
| 5,167,987 | 12/1992 | Yu | 427/171 |
| 5,173,141 | 12/1992 | Leseman et al. | 156/244.15 |
| 5,211,899 | 5/1993 | Fujii | 264/180 |
| 5,415,961 | 5/1995 | Yu et al. | 430/58 |
| 5,518,854 | 5/1996 | Yu et al. | 430/133 |
| 5,547,704 | 8/1996 | Nagashima et al. | 427/130 |
| 5,606,396 | 2/1997 | Yu et al. | 399/162 |

*Primary Examiner*—Jan H. Silbaugh
*Assistant Examiner*—Martin Fallon
*Attorney, Agent, or Firm*—Zosan S. Soong

[57] ABSTRACT

A method to remove during fabrication of a flexible electrostatographic imaging member, the curl from a curled layered member having a top surface and a bottom surface and comprised of a substrate and a thickest coated layer including: (a) heating a section of the curled layered member to at least the glass transition temperature of the thickest coated layer, thereby defining a heated layered member section containing a thickest coated layer section and a substrate section; (b) compressing the top surface and the bottom surface of the heated layered member section to expand the thickest coated layer section beyond the dimensions of the substrate section; and (c) cooling the heated layered member section such that the expanded thickest coated layer section shrinks to about the dimensions of the substrate section.

16 Claims, 3 Drawing Sheets

PHOTORECEPTOR CALENDERING METHOD

FIELD OF THE INVENTION

This invention relates to a calendering method that can eliminate the curl from a curled multi-layered imaging device during the fabrication for example of a photosensitive member.

BACKGROUND OF THE INVENTION

This invention relates in general to electrostatography and, in particular, to the preparation of electrophotographic imaging members having multiple layers. Flexible electrostatographic belt imaging members are well known in the art. Typical electrostatographic flexible belt imaging members include, for example, photoreceptors or photosensitive imaging members for electrophotographic imaging systems, and electroreceptors or ionographic imaging members for electrographic imaging systems. These belts are usually formed by cutting a rectangular sheet out from a web, overlapping the opposite ends of the cut sheet, and ultrasonically welding the overlapped ends together to form a welded seam belt.

In electrophotography, a flexible electrophotographic imaging belt or the like (imaging member) containing a photoconductive insulating layer on a conductive layer is imaged by first uniformly electrostatically charging its surface. The imaging member is then exposed to a pattern of activating electromagnetic radiation such as light. The radiation selectively dissipates the charge in the illuminated areas of the photoconductive insulating layer while leaving behind an electrostatic latent image in the non-illuminated areas. This electrostatic latent image may then be developed to form a visible image by depositing finely divided electroscopic marking particles on the surface of the photoconductive insulating layer. The resulting visible image may then be transferred from the imaging member directly or indirectly to a support such as paper. This imaging process may be repeated many times with reusable imaging members.

An electrophotographic imaging member may be provided in a number of forms. For example, the imaging member may be a homogeneous layer of a single material such as vitreous selenium or it may be a composite layer containing a photoconductor and another material. One type of composite imaging member comprises a layer of finely divided particles of a photoconductive compound dispersed in an electrically insulating organic resin binder. Layered photoreceptor of a typical electrophotographic imaging member having separate photogenerating and charge transport layers is disclosed in U.S. Pat. No. 4,265,990. The photogenerating layer is capable of photogenerating charge and injecting the photogenerated charge into the charge transport layer.

As more advanced, higher speed electrophotographic copiers, duplicators and printers were developed, degradation of image quality was encountered during extended cycling. Moreover, complex, highly sophisticated duplicating and printing systems operating at very high speeds have placed stringent requirements, including narrow operating limits, on photoreceptors.

The numerous layers found in many modern photoconductive imaging members must be highly flexible, adhere well to adjacent layers and exhibit predictable electrical characteristics within narrow operating limits to provide excellent toner images over many thousands of cycles. One type of multi-layered photoreceptor that has been employed as a flexible belt in electrophotographic imaging systems comprises a substrate, a conductive layer, a blocking layer, an adhesive layer, a charge generating layer, and a charge transport layer. This photoreceptor may also comprise additional layers such as an anti-curl backing layer and an overcoating layer.

When one or more photoconductive layers are applied to a flexible supporting substrate the resulting photoconductive imaging member tends to curl. Curling is undesirable for a number of reasons. During the electrophotographic imaging process, curling may result in non-uniform distances from a charging device. Non-uniform distances produce non-uniform charging, resulting in variations in high background deposits during development of the electrostatic latent image. Further, a curled imaging member requires considerable tension to flatten against a supporting member. Where the support comprises a large flat area for full frame flash exposure, the imaging member may tear while flattening. Further, belts from flattened, curled members are more likely to incur stress induced cracks during cycling. These cracks print out on the final electrophotographic copy. Member belts subjected to high tension to remove curling also are more vulnerable to develop premature mechanical failure due to belt creep and dynamic fatigue if used in belt module designs utilizing small roller sizes (e.g. 19 mm or smaller).

An anti-curl coating may be applied to the side of the supporting substrate opposite the photoconductive layer to counteract the imaging member curling. However, application of such a coating requires an additional operational step and additional materials thereby reducing production through-put and increasing cost. Further, anti-curl coatings have not been wholly satisfactory. The anti-curl coating may wear off after extended belt machine functions. The anti-curl coating may also delaminate and separate during functioning under service conditions of high temperature and high humidity rendering the photoconductive imaging member unacceptable for forming quality images. A photoconductive imaging member requiring an anti-curl coating to render imaging member flatness has added overall cross-sectional thickness which increases the bending stress of the imaging member causing it to reduce the resistance of the imaging member surface to fatigue stress during cyclic function over the machine belt support rollers. Fatigue stress leads to the development of cracks in the charge transport layer as well as seam delamination. In an imaging member belt, the presence of the anti-curl coating at the overlapped ends of a cut piece imaging member of a seam joint also increases the volume of molten mass ejected out in the ultrasonic seam welding process to form a larger seam splashing. The seam splashing interacts with the cleaning blade which has been found to cause blade wear problems in electrophotographic imaging and cleaning processes.

Moreover, an anti-curl coating reduces transparency. Hence, an anti-curl coating reduces the performance of electrophotographic imaging systems requiring rear exposure of electromagnetic radiation to activate imaging member back erase during the electrophotographic imaging process. Although the reduction in transparency may in some cases be compensated by increasing the intensity of the electromagnetic radiation, such increase is generally undesirable due to the amount of heat generated as well as the greater costs necessary to achieve the higher intensity.

U.S. Pat. No. 4,983,481 relates to an imaging member that addresses curl problems and discloses a method to effect the elimination of the need for an anti-curl coating by providing a substrate layer with a linear thermal contraction coefficient substantially identical to the linear thermal contraction coefficient of the charge transport layer. Many of the substrate materials disclosed in U.S. Pat. No. 4,983,481 provide satisfactory linear thermal contraction coefficients for matching the linear thermal contraction coefficient of a particular applied charge transport layer. However, these materials are otherwise unsatisfactory because they fail during the imaging member manufacturing process or in service under machine operating conditions. For example, substrate materials may develop cracks during solution coating of other layers in the imaging member manufacturing process.

Further, some imaging members characterized by substrates having a linear thermal contraction coefficient substantially identical to the linear thermal contraction coefficient of the charge transport layer fail under conditions of applied belt tension at elevated temperatures in an imaging machine environment. In manufacturing, a web of imaging member is subjected to a tension during the production coating process and to an elevated temperature of about 115° C. During machine operation, the belt is constantly subjected to a tension and to a machine cavity temperature of about 50° C. Under these conditions, some imaging members having substrates of matched linear thermal contraction coefficient may exhibit poor resistance to heat or low yield point which develops into permanent dimensional deformation problems. These substrate materials, for example, include polyvinyl fluoride resins such as TEDLAR™ and amorphous polyterephthalate resins such as MELINAR™. Thus, the curl-free characteristics of photosensitive imaging members comprising known substrate materials of matched linear thermal contraction coefficient have been unsatisfactory.

Conventional photosensitive members, photosensitive member preparation methods, and calendering processes are disclosed in Nagashima et al., U.S. Pat. No. 5,547,704; Leseman et al., U.S. Pat. No. 5,173,141; Yu et al., U.S. Pat. No. 5,518,854; Yu et al., U.S. Pat. No. 5,415,961; and Yu et al., U.S. Pat. No. 5,606,396.

SUMMARY OF THE INVENTION

Although this invention covers electrophotograpic imaging members and ionographic imaging members, the discussion hereinafter will focus on electrophotographic imaging member for reasons of simplicity.

The present invention is accomplished in embodiments by providing a method to remove during fabrication of a flexible electrostatographic imaging member, the curl from a curled layered member having a top surface and a bottom surface and comprised of a substrate and a thickest coated layer comprising:

(a) heating a section of the curled layered member to at least the glass transition temperature of the thickest coated layer, thereby defining a heated layered member section containing a thickest coated layer section and a substrate section;

(b) compressing the top surface and the bottom surface of the heated layered member section to expand the thickest coated layer section beyond the dimensions of the substrate section; and (c) cooling the heated layered member section such that the expanded thickest coated layer section shrinks to about the dimensions of the substrate section.

BRIEF DESCRIPTION OF THE DRAWINGS

Other aspects of the present invention will become apparent as the following description proceeds and upon reference to the Figures which represent preferred embodiments of the present invention.

DETAILED DESCRIPTION

Figure 1:
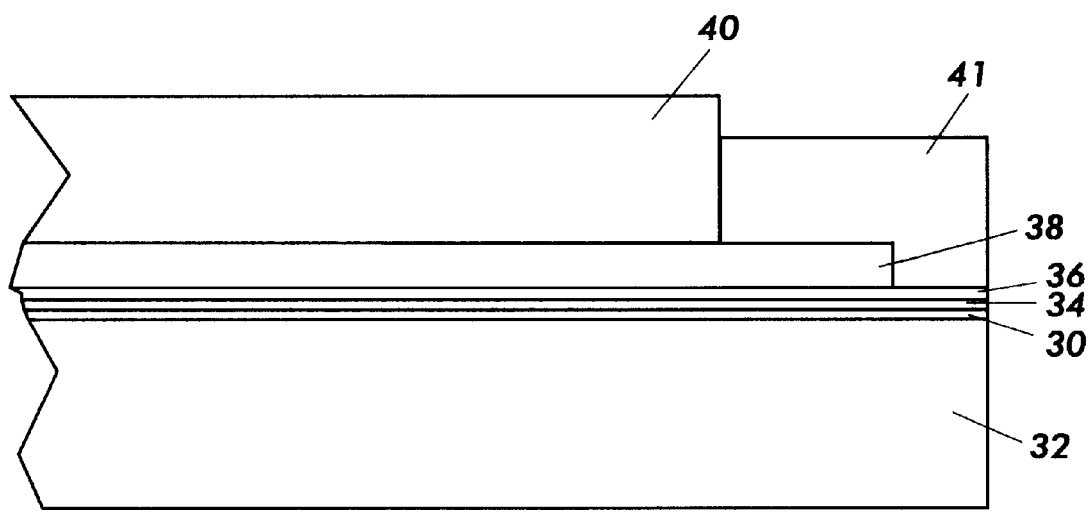
FIG. 1 is a schematic cross-sectional view of a photosensitive imaging member.

In the preferred embodiment of a flexible photosensitive imaging member shown in FIG. 1, the thickness of the substrate layer 32 depends on numerous factors, including mechanical strength and economic considerations, and thus, this layer for a flexible belt may, for example, have a thickness of at least about 50 micrometers, or of a maximum thickness less than about 150 micrometers, provided there are no adverse effects on the final electrophotographic imaging device.

The conductive layer 30 may vary in thickness over substantially wide ranges depending on the optical transparency and flexibility desired for the electrophotographic imaging member. Accordingly, when a flexible electrophotographic imaging belt is desired, the thickness of the conductive layer may be between about 20 angstrom units and about 750 angstrom units, and more preferably between about 50 angstrom units and about 200 angstrom units for an optimum combination of electrical conductivity, flexibility and light transmission. The conductive 30 layer may be an electrically conductive metal layer which may be formed, for example, on the substrate by any suitable coating technique, such as a vacuum depositing or sputtering technique. Typical metals include aluminum, zirconium, niobium, tantalum, vanadium, hafnium, titanium, nickel, stainless steel, chromium, tungsten, molybdenum, and the like. Where the entire substrate is an electrically conductive metal, the outer surface thereof can perform the function of an electrically conductive layer and a separate electrical conductive layer may be omitted.

After formation of an electrically conductive surface, a hole blocking layer 34 may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photogenerating layer 38 and the underlying conductive layer 30 may be utilized. The blocking layer may comprise nitrogen containing siloxanes or nitrogen containing titanium compounds as disclosed, for example, in U.S. Pat. Nos. 4,291,110; 4,338,387; 4,286,033; and 4,291,110, the disclosures of these patents being incorporated herein in their entirety. The blocking layer may be applied by any suitable conventional technique such as spraying, dip coating, draw bar coating, gravure coating, silk screening, air knife coating, reverse roll coating, vacuum deposition, chemical treatment and the like. The blocking layer should be continuous and preferably has a thickness of less than about 0.2 micrometer.

An optional adhesive layer 36 may be applied to the hole blocking layer. Any suitable adhesive layer may be utilized. One well known adhesive layer comprises a linear saturated copolyester reaction product of four diacids and ethylene glycol. This linear saturated copolyester consists of alternating monomer units of ethylene glycol and four randomly sequenced diacids in the above indicated ratio and has a weight average molecular weight of about 70,000 and a Tg of about 32° C. If desired, the adhesive layer may comprise a copolyester resin. The adhesive layer comprising the polyester resin is applied to the blocking layer. Any adhesive layer employed should be continuous and, preferably, have a dry thickness between about 200 micrometers and about 900 micrometers and, more preferably, between about 400 micrometers and about 700 micrometers. Any suitable solvent or solvent mixtures may be employed to form a coating solution of the polyester. Typical solvents include tetrahydrofuran, toluene, methylene chloride, cyclohexanone, and the like, and mixtures thereof. Any other suitable and conventional technique may be utilized to mix and thereafter apply the adhesive layer coating mixture of this invention to the charge blocking layer. Typical application techniques include spraying, dip coating, roll coating, wire wound rod coating, and the like. Drying of the deposited coating may be effected by any suitable conventional technique such as oven drying, infra red radiation drying, air drying and the like.

Any suitable photogenerating layer 38 may be applied to the blocking layer 34 or adhesive layer 36, if one is employed, which can thereafter be overcoated with a contiguous hole transport layer 40. Examples of photogenerating layer materials include, for example, inorganic photoconductive materials such as amorphous selenium, trigonal selenium, and selenium alloys selected from the group consisting of selenium-tellurium, selenium-tellurium-arsenic, selenium arsenide and mixtures thereof, and organic photoconductive materials including various phthalocyanine pigments such as the X-form of metal free phthalocyanine, metal phthalocyanines such as vanadyl phthalocyanine and copper phthalocyanine, quinacridones, dibromo anthanthrone pigments, benzimidazole perylene, substituted 2,4-diamino-triazines, polynuclear aromatic quinones, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example in U.S. Pat. No. 4,587,189, the entire disclosure thereof being incorporated herein by reference. Multi-photogenerating layer compositions may be utilized where a photoconductive layer enhances or reduces the properties of the photogenerating layer. Other suitable photogenerating materials known in the art may also be utilized, if desired. Any suitable charge generating layer comprising photoconductive particles dispersed in a film forming binder may be utilized. Photoconductive particles for a charge generating layer such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infrared light. The photogenerating materials selected should be sensitive to activating radiation having a wavelength between about 600 and about 700 nm during the imagewise radiation exposure step in a electrophotographic imaging process to form an electrostatic latent image.

Any suitable inactive resin materials may be employed in the photogenerating binder layer including those described, for example, in U.S. Pat. No. 3,121,006, the entire disclosure thereof being incorporated herein by reference. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, and the like.

The photogenerating composition or pigment can be present in the resinous binder composition in various amounts. Generally, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition.

The photogenerating layer containing photoconductive compositions and/or pigments and the resinous binder material generally ranges in thickness of from about 0.1 micrometer to about 5 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer 40 may comprise any suitable transparent organic polymer or non-polymeric material capable of supporting the injection of photogenerated holes and electrons from the charging generating layer and allowing the transport of these holes or electrons through the organic layer to selectively discharge the surface charge. The active charge transport layer 40 not only serves to transport holes or electrons, but also protects the photogenerating layer 38 from abrasion or chemical attack and therefor extends the operating life of the photoreceptor imaging member. The charge transport layer 40 should exhibit negligible, if any, discharge when exposed to a wavelength of light useful in xerography, e.g. 4000 angstroms to 9000 angstroms. Therefore, the charge transport layer is substantially transparent to radiation in a region in which the photoconductor is to be used. Thus, the active charge transport layer is a substantially non-photoconductive material which supports the injection of photogenerated holes from the generation layer. The active transport layer is normally transparent when exposure is effected through the active layer to ensure that most of the incident radiation is utilized by the underlying charge generating layer for efficient photogeneration. The charge transport layer in conjunction with the generation layer in the instant invention is a material which is an insulator to the extent that an electrostatic charge placed on the transport layer is not conducted in the absence of illumination.

The active charge transport layer 40 may comprise any suitable activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer.

The charge transport layer forming mixture preferably comprises an aromatic amine compound. An especially preferred charge transport layer employed in one of the two electrically operative layers in the multi-layer photoconductor of this invention comprises from about 35 percent to about 45 percent by weight of at least one charge transporting aromatic amine compound, and about 65 percent to about 55 percent by weight of a polymeric film forming resin in which the aromatic amine is soluble. The substituents should be free form electron withdrawing groups such as $NO_2$ groups, CN groups, and the like. Typical aromatic amine compounds include, for example, triphenylmethane, bis(4-diethylamine-2-methylphenyl)phenylmethane, 4'-4"-bis(diethylamino)-2',2"-dimethyltriphenylmethane, N,N'-bis (alkylphenyl)-(1,1'-biphenyl)-4,4'-diamine wherein the alkyl is, for example, methyl ethyl, propyl n-butyl etc., N,N'-diphenyl-N,N'-bis(chlorophenyl)-(1,1'-biphenyl)-4,4'-diamine, N,N'-diphenyl-N,N'-bis(3"-methylphenyl)-(1,1'-biphenyl)-4,4'-diamine, and the like dispersed in an inactive resin binder.

Any suitable inactive resin binder soluble in methylene chloride, chlorobenzene or other suitable solvent may be employed in the process of this invention. Typical inactive resin binders include polycarbonate resin, polyvinylcarbazole, polyester, polyarylate, polyacrylate, polyether, polysulfone, and the like. Molecular weights can vary, for example, from about 20,000 to about 1,500,000.

Examples of photosensitive imaging members having at least two electrically operative layers, including a charge generator layer and diamine containing transport layer, are disclosed in U.S. Pat. Nos. 4,265,990; 4,233,384; 4,306,008; 4,299,897 and 4,439,507, the disclosures thereof being incorporated herein in their entirety.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infrared radiation drying, air drying and the like. Generally, the thickness of the transport layer is between about 5 micrometers and about 100 micrometers, but thicknesses outside this range can also be used provided that there are no adverse effects.

The charge transport layer should be an insulator to the extent that the electrostatic charge placed on the charge transport layer is not conducted in the absence of illumination at a rate sufficient to prevent formation and retention of an electrostatic latent image thereon. In general the ratio of the thickness of the hole transport layer to the charge generating layer is preferably maintained from about 2:1 to 200:1 and in some instances as great as 400:1.

Other layers such as a ground strip layer 41 comprising, for example, conductive particles dispersed in a film forming binder may be applied to one edge of the photoreceptor in contact with the conductive layer 30, hole blocking layer, adhesive layer 36 or charge generating layer 38. The ground strip 41 may comprise any suitable film forming polymer binder and electrically conductive particles. Typical ground strip materials include those enumerated in U.S. Pat. No. 4,664,995. The ground strip layer 41 may have a thickness from about 7 micrometers to about 42 micrometers, and preferably from about 14 micrometers to about 23 micrometers.

The electrostatographic imaging member curling phenomenon will now be discussed in more detail. Since a photosensitive imaging member or electroreceptor comprising a web substrate of biaxially oriented polyethylene terephthalate (PET) having a coefficient of thermal contraction of about $1.8 \times 10^{-5}$° C., available from Farbenfabricken Bayer A. G., and a coating layer of polycarbonate (MAKROLON™), having a thickness of about 24 micrometers and a coefficient of thermal contraction of $6.5 \times 10^{-5}$/°C. applied by solution coating, is normally flat at elevated temperatures during drying, the coated web will tend to curl toward the dielectric imaging layer upon cooling to ambient room temperature because the polycarbonate layer will contract to a greater extent than the biaxially oriented PET layer. Thus, if this curled coated web is solution coated with another polycarbonate coating on the back side of the PET substrate and opposite to the polycarbonate imaging layer as the outer substrate layer, the requirement of heating to drive off the coating solvent at an elevated temperature will produce a counteracting contraction force after cooling to room temperature to balance the curling effect. If the applied anti-curl polycarbonate outer substrate layer is of the same thickness as the polycarbonate imaging layer, the resulting flexible imaging member will lie flat on a flat surface. However, an anti-curl layer is undesirable for the reasons stated herein.

If, instead of being subjected to the above described elevated temperature process, the flat biaxially oriented PET web is coated with a thick imaging layer of charge transport layer (CTL) solution containing 50 percent MAKROLON™ and 50 percent aromatic diamine weight ratio dissolved in methylene chloride at room temperature without the application of heat, the web tends to curl when the coating solvent evaporates due to the dimensional contraction of the applied coating from the point in time when the applied CTL coating solidifies and adheres to the underlying surface. Once this solidification and adhesion point is reached, further evaporation of coating solvent causes continued shrinking of the applied coating layer due to volume contraction resulting from removal of additional solvent will cause the coated web to curl toward the applied layer because the PET substrate does not undergo any dimensional changes. This shrinking occurs isotropically, i.e., three-dimensionally. In other words, from the point in time when the applied coating has reached a solid state and is anchored at the interface with the underlying support layer, continued shrinking of the applied coating causes dimensional decreases in the applied coating which in turn builds up internal tension stress and, therefore, forces the entire coated structure to curl toward the dry CTL applied coating. If the coated article has a circular shape, the curled structure will resemble that of a bowl. If placed in an oven and heated to about 90° C., this curled article will flatten because the Tg of the applied dry CTL coating is about 81° C. and the applied CTL coating will liquefy and no longer exert any stress on the coated web. At this instance, if this liquefied CTL coating is allowed to cool to just above 81° C., the CTL coating remains in a highly viscous liquid state and flowable and still does not exert any stress on the underlying substrate layer. However, this liquefied CTL coating will transform rapidly into a solid coating at 81° C. and anchors itself to the underlying layer. Further, cooling of this solid CTL coating from 81° C. down to room temperature causes the CTL coating to contract at about 3.5 to 4 times greater than that of the underlying biaxially PET substrate layer so that the coated article will curl up toward the CTL coating.

The photosensitive imaging member of the present invention may be employed in any suitable and conventional electrophotographic imaging process which utilizes uniform charging prior to imagewise exposure to activating electromagnetic radiation. When the imaging surface of an electrophotographic member is uniformly charged with an electrostatic charge and imagewise exposed to activating electromagnetic radiation. Conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the charged areas or discharged areas on the imaging surface of the electrophotographic member of the present invention. For example, for positive development, charged toner particles are attracted to the oppositely charged electrostatic areas of the imaging surface and for reversal development, charged toner particles are attracted to the discharged areas of the imaging surface.

It has, according to a calendering process employed for the present invention, been demonstrated that the inherent photosensitive imaging member curling problem as a result of charge transport layer coating and drying processes, was substantially or totally eliminated when the calendering process was carried out at a temperature preferably from about 1° C. to about 30° C. above the Tg of the thickest coated layer, more preferably from about about 5° C. to about 20° C. above the Tg of the thickest coated layer. The thickest coated layer may be any layer in an imaging member, but is preferably the charge transport layer. In embodiments of electroreceptors, the thickest coated layer is an ionographic layer. In addition, the thickest coated layer may be the top layer of the imaging member. Also, in embodiments, the Tg of the thickest coated layer may be between about 70° C. and about 150° C. The substrate may be a polymeric material having a Tg at least about 30° C. above the Tg of the thickest coated layer. In embodiments, the thickest coated layer section, when heated to at least its Tg and after the application of pressure to effect expansion, is larger in dimensions than that of the substrate section by an amount ranging from about 0.100% to about 0.400%. Furthermore, the pressing may be accomplished at a calendering pressure ranging for example from about 1,000 to about 2,000 pounds per linear inch pressing force. In the present invention, the expanded thickest coated layer section may be cooled to below its Tg such as down to ambient temperature, which is generally about 25° C. Preferably, the expanded thickest coated layer section shrinks to match the dimensions of the substrate section upon cooling to for example ambient temperature. The entire imaging member may be processed by the present invention, section by section, to remove the curl by for instance continuous calendering.

After the curl is eliminated, the layered photosensitive imaging member may be further processed such as by joining the ends of the layered substrate to form an endless belt using conventional techniques like that disclosed for example in Yu et al., U.S. Pat. No. 5,273,799, the disclosure of which is hereby totally incorporated by reference. The imaging member can be either a photosensitive member or an electroreceptor.

In embodiments, there may be only a single coated layer composed of photoconductive material over the substrate. A preferred structure of the photosensitive member is as follows: a substrate having an electrically conductive surface, a blocking layer over the substrate conductive surface, a charge generating layer over the blocking layer, a charge transport layer over the charge generating layer. The photosensitive member may also include one or more additional layers typically employed in a photoreceptor including for example an adhesive layer and an overcoat layer above the charge transport layer. In alternate embodiments of the present invention, the charge transport layer is adjacent to blocking layer with the charge generating layer over the transport layer. The present method renders unnecessary the presence of an anti-curl layer.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLE I

A photosensitive imaging member was prepared by providing a titanium coated biaxially oriented polyethylene terephthalate (Melinex 442, available from ICI Americas, Inc.) substrate having a thickness of 3 mil (76.2 micrometers), a width of 21 cm and a length of 28 cm, and applying thereto, using a Bird applicator, a solution containing 2.592 gm 3-aminopropyltriethoxysilane, 0.784 gm acetic acid, 180 gm of 190 proof denatured alcohol and 77.3 gm heptane. This layer was then allowed to dry for 5 minutes at room temperature and 5 minutes at 135° C. in a forced air oven. The resulting blocking layer had a dry thickness of 0.04 micrometer.

An adhesive interface layer was then prepared by the applying to the blocking layer a coating having a wet thickness of 0.5 mil and containing 0.5 percent by weight based on the total weight of the solution of polyester adhesive (DuPont 49,000, available from E. I. du Pont de Nemours & Co.) in a 70:30 volume ratio mixture of tetrahydrofuran/cyclohexanone with a Bird applicator. The adhesive interface layer was allowed to dry for 1 minute at room temperature and 5 minutes at 135° C. in a forced air oven. The resulting adhesive interface layer had a dry thickness of 0.05 micrometer.

The adhesive interface layer was thereafter coated with a photogenerating layer containing 7.5 percent by volume trigonal Se, 25 percent by volume N,N'-diphenyl-N,N'-bis (3-methylphenyl)-1,1'-biphenyl-4,4'-diamine, and 67.5 percent by volume polyvinylcarbazole. This photogenerating layer was prepared by introducing 0.8 gram polyvinyl carbazole and 14 ml of a 1:1 volume ratio of a mixture of tetrahydrofuran and toluene into a 2 oz. amber bottle. To this solution was added 0.8 gram of trigonal selenium and 100 grams of ⅛ inch diameter stainless steel shot. This mixture was then placed on a ball mill for 72 to 96 hours. Subsequently, 5 grams of the resulting slurry were added to a solution of 0.36 gm of polyvinyl carbazole and 0.20 gm of N,N'-diphenyl-N,N'-bis(3-methylphenyl)-1,1'-biphenyl-4, 4'-diamine in 7.5 ml of 1:1 volume ratio of tetrahydrofuran/ toluene. This slurry was then placed on a shaker for 10 minutes. The resulting slurry was thereafter applied to the adhesive interface with a Bird applicator to form a layer having a wet thickness of 0.5 mil. The layer was dried at 135° C. for 5 minutes in a forced air oven to form a dry thickness photogenerating layer having a thickness of 2.0 micrometers. Notwithstanding the fact that a thermal contraction mismatch between the PET substrate and the coating layers of the photogenerating layer, adhesive layer, and blocking layer existed, the imaging member at this state of fabrication did not curl because these coating layers were so thin that the total contraction force generated by their internal stresses was too small to cause curling.

This photogenerator layer was overcoated with a charge transport layer. The charge transport layer was prepared by introducing into an amber glass bottle in a weight ratio of 1:1 N,N'-diphenyl-N,N'-bis(3-methylphenyl)-1,1'-biphenyl-4,4'-diamine and Makrolon R, a polycarbonate resin having a molecular weight of from about 50,000 to 100,000 commercially available from Farbensabricken Bayer A. G. The resulting mixture was dissolved in methylene chloride to form a solution containing 15 percent by weight solids. This solution was applied on the photogenerator layer using a 3-mil gap Bird applicator to form a coating which upon drying had a thickness of 24 microns. During this coating process the humidity was equal to or less than 15 percent. The resulting photoreceptor device containing all of the above layers was annealed at 135° C. in a forced air oven for 5 minutes and thereafter cooled to ambient room temperature.

No anti-curl coating was applied to the back side of the substrate. The substrate had a linear thermal contraction coefficient of about $1.8 \times 10^{-5}/°C$. compared to the charge transport layer which had a greater linear thermal contraction coefficient of $6.5 \times 10^{-5}/°C$. While unrestrained, the opposite edges of the resulting photoreceptor curled upwardly toward the coated side to form a 1.5 inch (3.8 cm) diameter roll. This thermal contraction mismatch between the substrate and the charge transport layer had been determined to cause a 0.27% tension strain built-up in the transport layer.

COMPARATIVE EXAMPLE I

A comparative photosensitive imaging member was prepared in exactly the same manner and using the same materials as described in Example I, except that a dry 14 micrometers thick anti-curl coating was applied to the back side of the substrate, opposite to the side bearing the charge transport layer to counteract curl and to render the resulting photoconductive imaging member flat.

The anti-curl coating was prepared by combining 8.82 grams of polycarbonate resin (Makrolon 5705, 8.18 percent by weight solids, available from Bayer AG), 0.9 gram of polyester resin (Vitel PE 100, available from Goodyear Tire and Rubber Co.), and 90.07 grams of methylene chloride in a glass container to form a coating solution containing 8.9 percent solids. The container was covered tightly and placed on a roll mill for about 24 hours until the polycarbonate and polyester were dissolved in the methylene chloride. The anti-curl coating solution was applied to the rear surface (side opposite the photoconductive imaging layer) and dried at 135° C. for about 5 minutes to yield the desired anti-curl coating thickness.

EXAMPLE II

A charge transport layer solution was prepared according to the procedures and using the same materials as described in EXAMPLE I. The prepared charge transport layer solution was applied over a Teflon coated release paper, using a 3-mil gap Bird applicator, and dried at 135° C. for 5 minutes to give a dry free standing film of the charge transport layer having a thickness of 24 microns. This charge transport layer was analyzed for its glass transition temperature, Tg, using the differential scanning calorimetry DSC method. The measured Tg for the charge transport layer was 81.5° C. This charge transport layer and a polyethylene terephthalate substrate (the PET substrate) were then each determined for Young's modulus and stress-strain property at each temperature of 25, 50, 75, 82, and 100° C.

For Young's modulus measurement at each specific temperature, the following procedures were followed:

(a) Cut five charge transport layer samples each having dimensions of 1.27×10.16 cm (0.5"×4");

(b) Insert the sample in the jaws of an Instron Tensile Tester (Model TM) with 127 cm (2 inches) gage length;

(c) Using a 0.051 cm/min. (0.02"/min.) crosshead speed, a 50.8 cm/min. (20"/min.) chart speed, and a 0.454 kg (1 lb.) full scale, pull the sample to establish the force-elongation characteristic;

(d) Draw the best straight line over the force-elongation curve on the chart to represent the slope;

(e) Calculate the Young's modulus of the sample according to the slope of the straight line; and (f) Plot the average modulus value with respect to each temperature at which the measurement was carried out.

For yield strain determination, the force-elongation characteristic curve obtained from the Young's measurement was converted to stress-strain plot. The yield strain is defined as the percent elongation at which the stress ceases to exhibit linear relationship to the applied stress is characterized as the yield point of the sample at the temperature measured.

Figure 2:
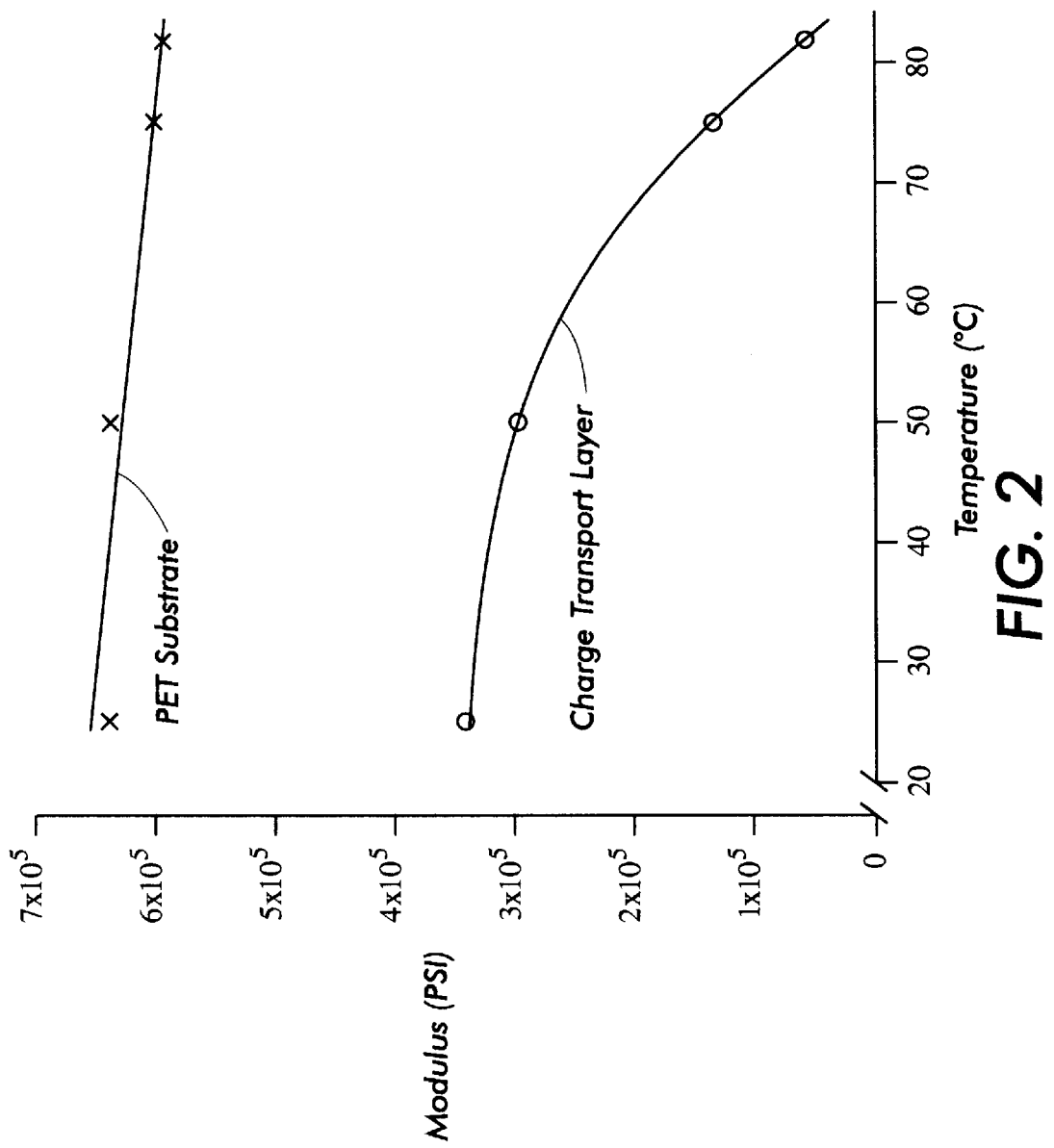
FIG. 2 is a modulus-temperature relationship plot describing specifically the mechanical modulus of the substrate support and the charge transport layer of the imaging member with respect to temperature.
Figure 3:
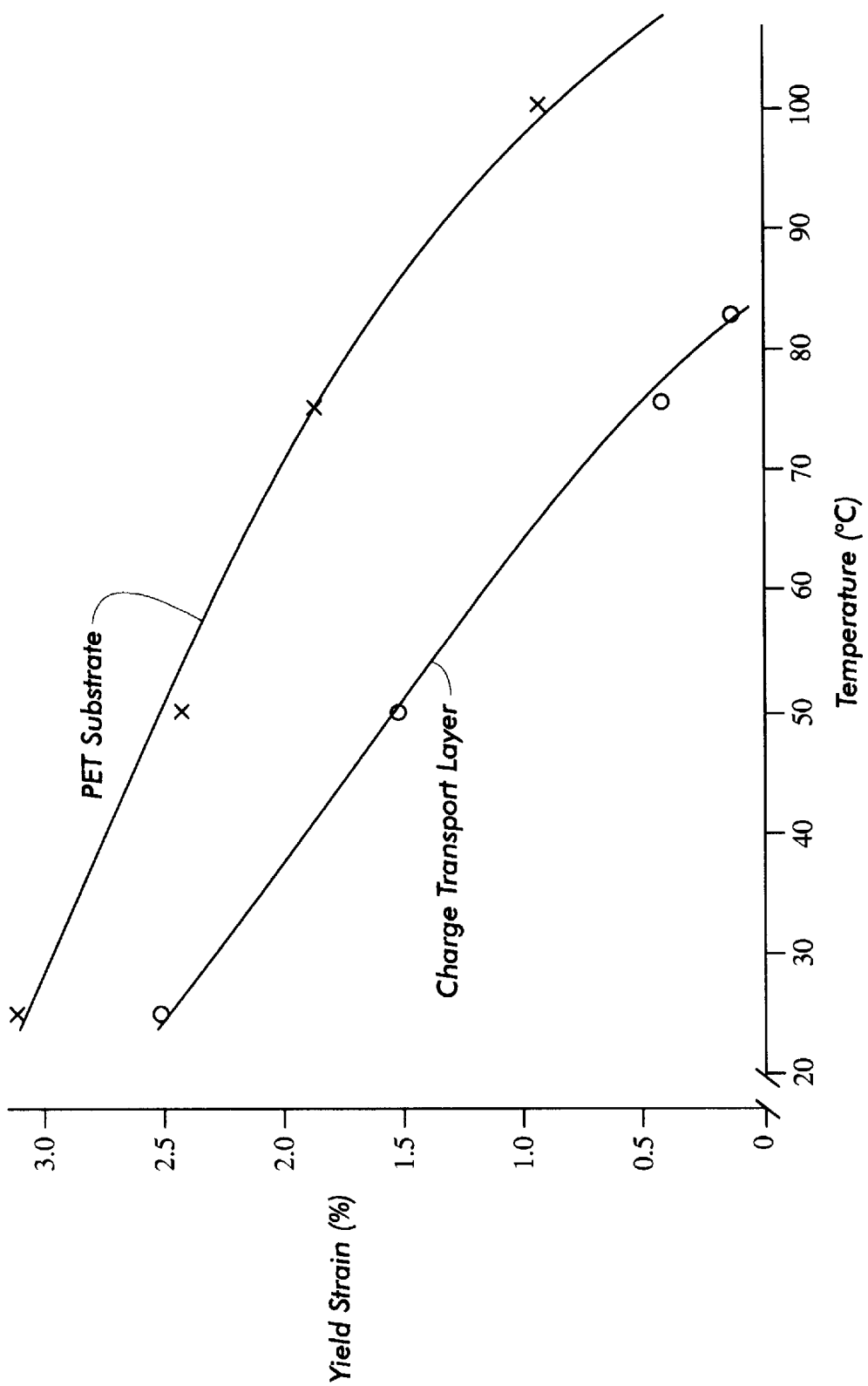
FIG. 3 is a yield point-temperature relationship plot describing the yield strain of the substrate and the charge transport layer of the imaging member as a function of temperature.

The results of the Young's modulus and yield strain obtained for the charge transport layer and the polyethylene terephthalate substrate are listed in Tables I and II below and respectively presented in FIGS. 2 and 3.

TABLE I

| | YOUNG'S MODULUS (PSI) | | | | |
|---|---|---|---|---|---|
| LAYER | 25° C. | 50° C. | 75° C. | 82° C. | 100° C. |
| charge transport | $3.4 \times 10^5$ | $2.9 \times 10^5$ | $1.2 \times 10^5$ | $0.5 \times 10^5$ | — |
| substrate | $6.3 \times 10^5$ | $6.2 \times 10^5$ | $6.0 \times 10^5$ | $5.8 \times 10^5$ | 5.6 |

TABLE II

| | YIELD STRAIN (%) | | | | |
|---|---|---|---|---|---|
| LAYER | 25° C. | 50° C. | 75° C. | 82° C. | 100° C. |
| charge transport | 2.5 | 1.5 | 0.4 | 0.1 | — |
| substrate | 3.1 | 2.5 | 1.8 | 1.6 | 1.1 |

The data given in the tables above show that both Young's modulus and yield strain of the polyethylene terephthalate substrate support were least affected by the temperature increase in the range between 25 and 100° C. However, these mechanical properties of charge transport layer were significantly dependent on the temperature at which the measurement was carried out. At the vicinity of the Tg, both the modulus and yield strain of the charge transport layer dropped to a very low value since the layer exhibited a viscous liquid-like characteristic; and mechanical measurements were ineffectual to be carried out at 100° C. These results indicate that at the Tg of charge transport layer and under an externally imposed stress, the charge transport layer will yield and expand in response to the applied stress while the substrate will be least affected and maintains its dimensional stability.

EXAMPLE III

With the information available from EXAMPLE II, a 100 feet photosensitive imaging member web, with a material package identical to the description in EXAMPLE I, was coated using the production coater. This imaging member web, having no anti-curl coating and exhibiting upward curling, was heated to a temperature 3° C. above the glass transition temperature Tg of the charge transport layer as it passed through a calendering process to expand only the charge transport layer (as a result of the compression force generated by the calendering) such that the dimensional expansion of the charge transport layer at the Tg by calendering compression was precisely enough to offset the thermal contraction mismatch between the charge transport layer and the polyethylene terephthalate substrate support of the imaging member, to effect imaging member flatness as it cooled down to room ambient. The conditions employed for the calendering process were:

Two 10-inch diameter steel calendering rolls filled with heated oil to maintain temperature target;

87° C. calendering temperature;

1,500 pounds per linear inch (pli) of calendering pressure; and 25 feet/min. imaging member web feeding speed.

The resulting photosensitive imaging member web was virtually free of curling after passing through this calendering process.

Other modifications of the present invention may occur to those skilled in the art based upon a reading of the present disclosure and these modifications are intended to be included within the scope of the present invention.

We claim:

1. A method to remove the curl from a curled layered flexible electrostatographic imaging member, having a top surface and a bottom surface and comprised of a substrate and at least one coating layer wherein there is one coating layer that is the thickest of the at least one coating layer, thereby defining a thickest coated layer, comprising:

(a) heating a section of the curled layered member to at least the glass transition temperature of the thickest coated layer, thereby defining a heated layered member section containing a thickest coated layer section and a substrate section;

(b) compressing the top surface and the bottom surface of the heated layered member section to expand the thickest coated layer section beyond the dimensions of the substrate section; and (c) cooling the heated layered member section such that the expanded thickest coated layer section shrinks to about the dimensions of the substrate section.

2. The method of claim 1, wherein the layered member is a photosensitive member.

3. The method of claim 1, wherein the layered member is an electroreceptor.

4. The method of claim 1, wherein the thickest coated layer includes charge transport material.

5. The method of claim 1, wherein the thickest coated layer is an ionographic layer.

6. The method of claim 1, wherein the substrate is a polymeric material having a Tg at least about 30° C. above the Tg of the thickest coated layer.

7. The method of claim 1, wherein the thickest coated layer is the top layer of the layered member.

8. The method of claim 1, wherein the Tg of the thickest coated layer is between about 70° C. and about 150° C.

9. The method of claim 1, wherein the thickest coated layer section when heated to at least its Tg and after the compressing is larger than the dimensions of the substrate section by an amount ranging from about 0.100% to about 0.400%.

10. The method of claim 1, wherein the compressing is accomplished by calendering the heated layered member section between two rolls.

11. The method of claim 1, wherein the compressing is accomplished at a calendering pressure ranging from about 1,000 to about 2,000 pounds per linear inch.

12. The method of claim 1, further comprising treating another section of the layered member with steps (a), (b), and (c).

13. The method of claim 1, wherein the expanded thickest coated layer section is cooled to below its Tg.

14. The method of claim 1, wherein the expanded thickest coated layer section shrinks to match the dimensions of the substrate section.

15. The method of claim 1, wherein the expanded thickest coated layer is cooled to ambient temperature.

16. The method of claim 1, wherein the heating is accomplished at a temperature ranging from about 1° C. to about 30° C. above the Tg of the thickest coated layer.

* * * * *